(12) United States Patent  
Mana et al.

(10) Patent No.: US 8,851,539 B2
(45) Date of Patent: Oct. 7, 2014

(54) ENERGY ABSORBING ASSEMBLY

(75) Inventors: Dinesh Mana, Bangalore (IN); Taehoon Kim, Goyang-si (KR)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/477,367

(22) Filed: May 22, 2012

(65) Prior Publication Data
US 2013/0175813 A1 Jul. 11, 2013

Related U.S. Application Data

(60) Provisional application No. 61/632,414, filed on Jan. 6, 2012.

(51) Int. Cl.
*B60R 19/03* (2006.01)

(52) U.S. Cl.
USPC ............................................................ 293/120

(58) Field of Classification Search
USPC ................. 293/102, 120, 187.04, 187.09; 296/187.04, 187.09
See application file for complete search history.

(56) References Cited

U.S. PATENT DOCUMENTS

| | | | |
|---|---|---|---|
| 5,154,462 A | 10/1992 | Carpenter | |
| 5,290,079 A | 3/1994 | Syamal | |
| 5,425,561 A | 6/1995 | Morgan | |
| 5,988,713 A | 11/1999 | Okamura et al. | |
| 6,007,123 A | 12/1999 | Schwartz et al. | |
| 6,270,600 B1 * | 8/2001 | Wycech | 156/79 |
| 6,308,999 B1 | 10/2001 | Tan et al. | |
| 6,609,740 B2 | 8/2003 | Evans | |
| 6,669,251 B2 * | 12/2003 | Trappe | 293/120 |
| 6,672,635 B2 * | 1/2004 | Weissenborn et al. | 293/120 |
| 6,814,379 B2 | 11/2004 | Evans | |
| 6,817,638 B1 * | 11/2004 | Choi et al. | 293/109 |
| 6,874,832 B2 | 4/2005 | Evans et al. | |

(Continued)

FOREIGN PATENT DOCUMENTS

| | | |
|---|---|---|
| EP | 0652138 B1 | 1/2000 |
| EP | 1369308 B1 | 9/2006 |

(Continued)

OTHER PUBLICATIONS

International Search Report of the International Searching Authority for International Application No. PCT/US2012/057218; International Filing Date: Dec. 12, 2012; 6 Pages.

(Continued)

*Primary Examiner* — Joseph D Pape
*Assistant Examiner* — Dana Ivey
(74) *Attorney, Agent, or Firm* — Cantor Colburn LLP

(57) ABSTRACT

An energy absorbing assembly for impact energy absorption can comprise: an elongated plastic member having a major axis, a first side and a second side, comprising a central portion disposed between a first end portion and a second end portion, the second side defines a channel extending from the first end portion to the second end portion; and an elongated insert having a front, edges, tips, and a rear, wherein the insert is configured to flex upon impact, and is removably friction fit within the channel such that the plastic member surrounds the front, and greater than or equal to 50% of the edges and tips. The energy absorbing assembly can be configured to attach to a vehicle to absorb energy absorption impact. A vehicle can comprise: a vehicle rail and the energy absorbing assembly attached to the vehicle rail.

23 Claims, 8 Drawing Sheets

(56) References Cited

U.S. PATENT DOCUMENTS

| | | |
|---|---|---|
| 6,877,785 B2 | 4/2005 | Evans et al. |
| 6,994,384 B2 * | 2/2006 | Shuler et al. .......... 293/120 |
| 7,044,515 B2 | 5/2006 | Mooijman et al. |
| 7,172,227 B2 | 2/2007 | Weissenborn et al. |
| 7,806,448 B2 | 10/2010 | Allen et al. |
| 7,866,716 B2 | 1/2011 | Perucca et al. |
| 8,215,686 B2 | 7/2012 | Czopek et al. |
| D670,217 S | 11/2012 | Bobba et al. |
| D670,218 S | 11/2012 | Bobba et al. |
| 2002/0149214 A1 | 10/2002 | Evans |
| 2003/0020291 A1 | 1/2003 | Roussel et al. |
| 2003/0132647 A1 | 7/2003 | Cooper |
| 2003/0227183 A1 | 12/2003 | Weissenborn et al. |
| 2004/0174025 A1 | 9/2004 | Converse et al. |
| 2004/0262931 A1 | 12/2004 | Roussel et al. |
| 2006/0001277 A1 | 1/2006 | Mellis et al. |
| 2006/0028033 A1 | 2/2006 | Kim |
| 2006/0255602 A1 | 11/2006 | Evans |
| 2007/0200376 A1 | 8/2007 | Jaarda et al. |
| 2007/0257497 A1 | 11/2007 | Heatherington et al. |
| 2008/0079272 A1 | 4/2008 | Arwashan |
| 2012/0104775 A1 | 5/2012 | Marur et al. |
| 2012/0104778 A1 | 5/2012 | Mana et al. |
| 2012/0153643 A1 | 6/2012 | Mana et al. |

FOREIGN PATENT DOCUMENTS

| | | |
|---|---|---|
| EP | 1291266 B1 | 4/2008 |
| GB | 634280 A | 3/1950 |
| WO | 2007001275 A1 | 1/2007 |
| WO | 2007001277 A1 | 1/2007 |

OTHER PUBLICATIONS

Written Opinion of the International Searching Authority for International Application No. PCT/US2012/057218; International Filing Date: Dec. 12, 2012; 8 Pages.

German Patent Publication No. 10205627 (A1); Date of Publication: Aug. 14, 2003; 1 Page; Abstract Only.

German Patent Publication No. 3342332 (A1); Date of Publication: Jun. 14, 1984; 1 Page; Abstract Only.

European Patent No. 1291266 (B1); Publication Apr. 16, 2008; Abstract Only; 1 Page.

European Patent No. 1369308 (B1); Publication Date: Sep. 20, 2006; Abstract Only; 1 Page.

Koziel et al.; "New RCAR Test-Adjusted Bumper Beam", SAE International 2011-01-0222; Published: Apr. 12, 2011; 10 Pages.

Lim et al.; "Development of Automobile Bumper Beam Using Hybrid Process"; SAE International 2011-01-0006; Published: Apr. 12, 2011; 9 Pages.

* cited by examiner

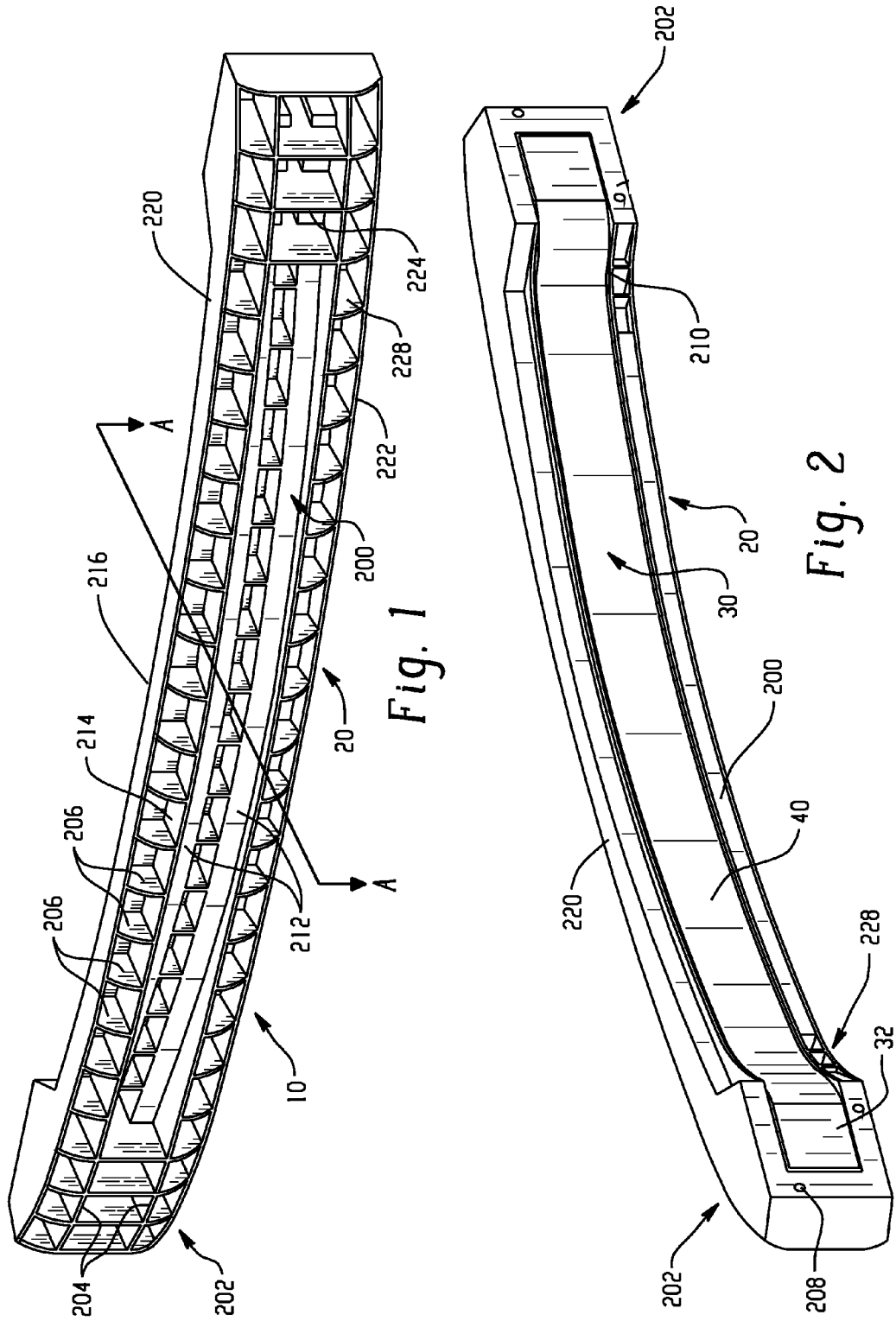

ENERGY ABSORBING ASSEMBLY

CROSS REFERENCE TO RELATED APPLICATIONS

This application claims priority to U.S. Provisional Application Ser. No. 61/632,414, filed Jan. 6, 2012, the contents of which are incorporated herein.

TECHNICAL FIELD

The present disclosure relates generally to energy absorbers for use in a vehicle, for example, to reduce injuries (e.g., to occupant(s), pedestrian(s), etc.) as well as to reduce vehicle damage. Particularly, the present disclosure relates to a metal-plastic hybrid energy absorbing beam system that can absorb impact energy at low and moderate speeds.

BACKGROUND

Regulations governing the low-speed damageability requirements for automobiles across the globe are different. These regulations, in general, can be classified into two categories: the first for the European continent and the second for the U.S. Although, the terminologies used are different, the Pacific Rim also follows the European norms with slightly more relaxed requirements for impact. This means that the energy absorbing system designed to meet the requirements in Europe & Pacific rim are different from the one used for the U.S. market.

In Europe and the Pacific region, the Economic Commission for Europe (ECE) 42 (1 Jun. 1980) and Research Council for Automobile Repair (i.e., low speed 15 kilometers per hour (kph)), Offset Insurance Crash Test to determine Damageability and Repairability features of a Motor Vehicle, January 1999 (hereinafter "RCAR") require that bumper systems at both the front and rear side of the vehicle withstand impact as specified in these standards. In the U.S., a vehicle has to meet Federal Motor Vehicle Safety Standards (FMVSS, i.e. Title 49 of the Code of Federal Regulation (CFR) part 581 dated Apr. 25, 1990; hereinafter "FMVSS part 581") and RCAR, and the Insurance Institute for Highway Safety 10 kph low speed frontal and rear test, May 2006 (hereinafter "IIHS 10 kph test"). The RCAR test program is used by several test houses in Europe, Asia, and South America. FMVSS part 581 is similar in lines with the United Nations Economic Commission for Europe (ECE) regulation No. 42 (ECE-42), dated Nov. 21, 1980, but slightly less stringent, specifying performance requirements for passenger cars in low-speed front and rear collisions. FMVSS part 581 applies to front and rear bumpers on passenger cars to prevent the damage to the car body and safety related equipment at barrier impact speeds of 4.0 kph (2.5 miles per hour (mph)) across the full width and 2.5 kph (1.5 mph) on the corners. The Economic Commission for Europe (ECE) regulation No. 42 requires that a car's safety systems continue to operate normally after the car has been impacted by a pendulum or moving barrier on the front or rear longitudinally at 4 kph (~2.5 mph) and on the front and rear corner at 2.5 kph (~1.5 mph) at 455 mm (about 18 inches) above the ground under loaded and unloaded conditions. The U.S. calls for an additional regulatory requirement of IIHS deformable barrier, which is typically at a speed of 10 kph at the center of the vehicle. Accordingly, for the global automobile manufacturer, it is extremely important to develop a cost-effective global system, which can be easily optimized to meet the requirements at various regulatory platforms. Therefore, an automobile designed to meet the European low-speed damageability regulations may not meet the U.S. damageability requirements. On the other hand, an automobile designed to meet the U.S. requirements may be overdesigned for the European standards. Therefore, there is a need to provide versatile and low cost energy absorbing systems that will still meet strict and at times conflicting design constraints across a variety of government regulations.

SUMMARY

Disclosed, in various embodiments, are hybrid energy absorbing systems that can be used in conjunction with various vehicle components.

In an embodiment, an energy absorbing assembly for impact energy absorption can comprise: an elongated plastic member having a major axis, a first side and a second side, comprising a central portion disposed between a first end portion and a second end portion, the second side defines a channel extending from the first end portion to the second end portion; and an elongated insert having a front, edges, tips, and a rear, wherein the insert is configured to flex upon impact, and is removably friction fit within the channel such that the plastic member surrounds the front, and greater than or equal to 50% of the edges and tips. The energy absorbing assembly can be configured to attach to a vehicle to absorb energy upon impact.

In an embodiment, a vehicle can comprise: a vehicle rail and the energy absorbing assembly attached to the vehicle rail. The energy absorbing assembly comprises an elongated plastic member having a major axis, a first side and a second side, comprising a central portion disposed between a first end portion and a second end portion, the second side defines a channel extending from the first end portion to the second end portion; and an elongated insert having a front, edges, tips, and a rear, wherein the insert is configured to flex upon impact, and is removably friction fit within the channel such that the plastic member surrounds the front, and greater than or equal to 50% of the edges and tips. The energy absorbing assembly can be configured to attach to a vehicle to absorb energy absorption impact.

In another embodiment, a vehicle can comprise: a vehicle rail and an energy absorbing assembly attached to the vehicle rail. The energy absorbing assembly comprises an elongated plastic member having a major axis, a first side and a second side, comprising a central portion disposed between a first end portion and a second end portion, the second side defines a channel extending from the first end portion to the second end portion. The vehicle passes ECE 42.

In an embodiment, a vehicle can comprise: a vehicle rail and an energy absorbing assembly attached to the vehicle rail. The energy absorbing assembly can consist of an elongated plastic member. The plastic member comprises a major axis, a first side and a second side, comprising a central portion disposed between a first end portion and a second end portion, the second side defines a channel extending from the first end portion to the second end portion. The vehicle passes ECE 42.

The foregoing and other features will be more readily apparent from the following detailed description and drawings of the illustrative embodiments.

BRIEF DESCRIPTION OF THE DRAWINGS

The features of the energy absorbing system described will become apparent from the following detailed description when read in conjunction with the drawings, which are exemplary, not limiting, and wherein like elements are numbered alike in several figures.

FIG. 1 is a front perspective view of an embodiment of a hybrid energy absorber (EA) system.

FIG. 2 is a rear perspective view of the energy absorbing assembly of FIG. 1.

DETAILED DESCRIPTION

Figure 3:
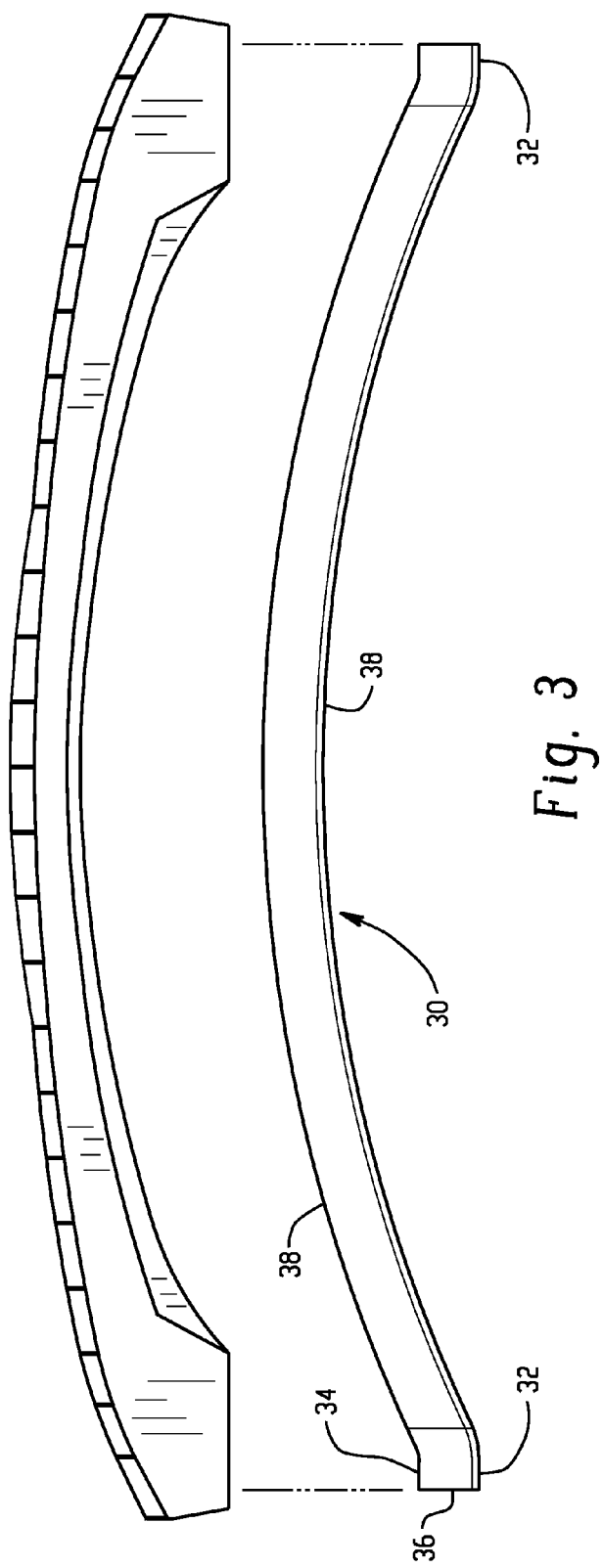
FIG. 3 is a side perspective view of the insert for the energy absorbing assembly of FIG. 1.

It has been determined that a pure plastic member will not meet all of the standards. (ECE 42, RCAR, FMVSS part 581, and IIHS 10 kph test, and deformable barrier impact test) Hence, the current trend is to use a metal system. However, a metal system is overdesigned for the European standards. Disclosed herein is a light-weight energy absorbing assembly (e.g., a hybrid plastic-metal energy absorbing systems), which can be used in several combinations to meet each of the global requirements. In other words, the presently disclosed energy absorbing assembly can be tailored to meet the desired standard. A different design is not needed. The present system enables reduced manufacturing costs since one design can be employed to meet each standard. In other words, the energy absorbing assembly can be tuned and used in several combinations to meet the global damageability requirements across various global platforms and regulatory standards.

Disclosed herein, in various embodiments, are energy absorbing assemblies which can be used in conjunction with vehicle components, e.g., to minimize vehicle damage and/or injury suffered during an impact. The energy absorbing assemblies can replace the bumper beam, e.g., they attach directly to the vehicle without the use of a bumper beam. The energy absorbing assemblies disclosed herein can be used in the front and/or rear of a vehicle, attaching directly to the vehicle (e.g., to the rails). Where the energy absorbing assembly is used, the vehicle can be absent a bumper beam (i.e., no bumper beam is present on the side of the vehicle that includes this energy absorbing assembly).

The energy absorbing assembly can comprise a plastic member, e.g., an elongated plastic energy absorber member, and an insert that is removably inserted in a channel in the plastic member. The insert provides structural integrity to the system and enables the system to pass the more stringent test standards such as IIHS 10 kph impact. The plastic member, which can be manufactured utilizing various molding processes (e.g., injection molding, thermoforming, extrusion, etc.), is an elongated member that has a sufficient length to extend across the front or rear of a vehicle, e.g., at least from rail to rail such that the plastic member can attach directly to the vehicle component.

At the ends of the plastic member, e.g., at the portion of the member that can attach to the vehicle, can be corner crush boxes (i.e., forming the two opposite ends of the elongated plastic member). In between the end portions that can optionally comprise the crush cans (e.g., in the central portion), can be reinforcing elements (e.g., rib(s)) and horizontal protrusion(s). The horizontal protrusion(s) for a cavity on the reverse side of the plastic member configured to matingly receive the insert and retain the insert. The insert can be retained with a friction fit. In other words, the insert is friction fit into the channel without mechanical or chemical attachments (e.g., glue, adhesive, mechanical means, and so forth).

The plastic member can comprise any plastic material or combination of plastic materials that can be formed into the desired shape and provide the desired properties. Some desirable characteristics of the plastic member include high toughness/ductility, thermal stability, high energy absorption efficiency, a good modulus-to-elongation ratio, and recyclability, among others, wherein "high" and "good" are intended to mean that the characteristic at least meets vehicle safety regulations and requirements for the given component/element. Examples of materials for use as the plastic member include thermoplastic materials as well as combinations of thermoplastic materials with elastomeric materials, and/or thermoset materials. Possible thermoplastic materials include at least one of the foregoing polybutylene terephthalate (PBT); acrylonitrile-butadiene-styrene (ABS); polycarbonate; polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP), expanded polypropylene (EPP); and thermoplastic olefins (TPO). For example, the plastic component can comprise Xenoy*, which is commercially available from SABIC Innovative Plastics IP B.V. as well as STAMAX*, which is commercially available from Saudi Basic Industries Corporation. The plastic member can also be formed from combinations comprising at least one of any of the above-described materials. The plastic member can be free of metals. The term "elastomeric" or "elastomeric material" refers in an embodiment to cross-linked thermosetting rubbery polymers that are more easily deformable than plastics. The plastic member's central portion and the extremities (i.e., end portions) can comprise the same plastic material, or the central portion and extremities (alternatively referred to herein as crush boxes) can each independently comprise a plastic material (e.g., thermoplastic material) that is different from each other.

The plastic member can be manufactured utilizing various molding processes (e.g., injection molding, thermoforming, extrusion, etc.) to provide a single piece assembly (e.g., an integrally formed energy absorber).

As is noted above, the horizontal protrusion(s) form a cavity configured to receive the insert. Depending upon the particular standards that the energy absorbing assembly is intended to meet, the system can be used on a vehicle with or without the insert. When the insert is employed, it is disposed in the channel of the plastic member such that all sides of the insert are covered by the plastic member except the back, and less than 30% of the edges, specifically, less than 15% of the edges, and more specifically, the plastic member covers the edges as well as the front of the insert (i.e., only the back of the insert is not covered by the plastic member (the back is left uncovered)). The insert can be removably installed into the plastic member from the rear of the plastic member, pressing the insert into the channel. The insert has a shape complementary to the shape of the channel, and extends, longitudinally, such that the ends of the insert can directly contact the vehicle attachment component (e.g., rail support) during use.

For example, the insert can be a resilient removable portion shaped as a recurve bow. As used herein, the term "resilient" refers to a material that is compliant or flexible or otherwise capable of elastic deformation with a resilience of greater than or equal to 5 kiloNewtons (kN). Although the insert can be flat (i.e., without a bend), a curved insert, especially in the area between the end portions (i.e., extending between the vehicle connection areas) is desirable to enhance the energy absorption characteristics. The insert can have a radius of curvature of greater than or equal to 500 mm, specifically 500 mm to 3,500 mm, more specifically, 1,000 mm to 3,000 mm, and yet more specifically, 1,800 mm to 2,200 mm. For some vehicle designs, the insert radius of curvature can be 500 mm to 1,500 mm, specifically, 500 mm to 1,000 mm.

The insert can be formed of any material capable attaining the desired structural integrity to meet the impact standards. For example, the insert can be metal, or a reinforced plastic (e.g., long fiber reinforced plastic such as STAMAX*, long glass fiber reinforced polypropylene commercially available from Saudi Basic Industries Corporation; SUPERLIT* a glass giber reinforced polyester, and so forth), as well as combinations comprising at least one of the foregoing. Some possible metals include steel, iron, aluminum, and combinations comprising at least one of the foregoing, such as hard-enable sheet steel, aluminum alloy, and so forth. Metal inserts are particularly useful. If the insert is plastic it will comprise a different material than the energy absorber.

As noted above, the insert can have a geometry that is complementary to the channel geometry. Some examples of insert geometries (i.e., cross-sectional geometries taken perpendicular to the longitudinal axis (e.g., along lines A-A of FIG. 1)) include: "W", "I", "E", "U", as well as others. The insert can be formed via various methods such as rolling, forging, bending, hydroforming, and so forth, or a combination process comprising at least one of the foregoing.

The overall size, e.g., the specific dimensions of the energy absorbing assemblies described herein will depend upon its location in the vehicle (front and/or rear) and its function, as well as the particular vehicle for which it is intended. For example, the length (l), height (h), and width (w) of the energy absorbing assemblies will depend upon the amount of space available in the desired location of use (e.g. "packaging") as well as the needed energy absorption profile. The specific channel depth and thicknesses of the plastic member and/or crush boxes (end portions) will also depend upon the available space, desired stiffness, and the materials (or combination of materials) employed.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1 is a front perspective view of an embodiment of the energy absorbing assembly (10), while FIG. 2 is a rear prospective view of the energy absorbing assembly (10) of FIG. 1. As illustrated in FIG. 1, the elongated plastic member (20) is a multicomponent element comprising a plurality of horizontal protrusions (212) longitudinally spanning the major axis of the plastic member. The plastic member (20) can bow outward (i.e., away from a vehicle when the energy absorbing assembly is attached to a vehicle), such that it has the same or higher amplitude than the amplitude of the insert (30).

Figure 14:
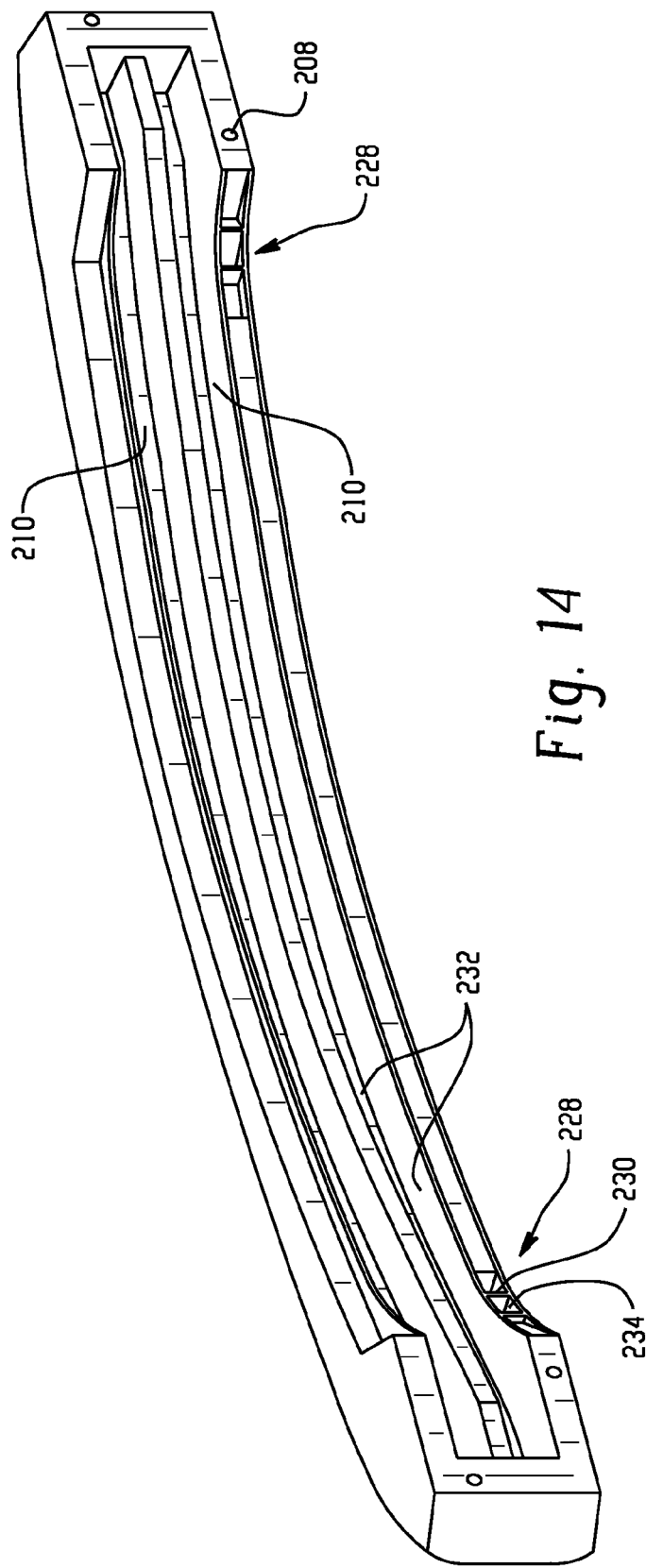
FIG. 14 is a rear perspective view of the plastic member of the energy absorbing assembly of FIG. 1.

The plastic member (20) comprises a channel (210) configured to receive the insert (30). (See also FIG. 14) Hence, the channel (210) can have complementary geometries so that the insert (30) can be oriented in the channel (210) such that the ends of the insert (30) are enclosed on greater than or equal to 3 (e.g., 4) sides by the end of the plastic member (20). In other words, the end (32), front (34), tip (36), and edges (38) of the insert (30) are disposed in the plastic member (20). (See also FIG. 3) Only the rear (40) of the insert end (32) remains exposed. The channel (210) is designed to receive the insert (30) in a friction fit so that the insert (30) is removable (i.e., can be removed from the plastic portion, without damage to the plastic portion or the insert). The insert (30) is fitted into the channel (210) such that it is not inadvertently dislodged or dislodged during use.

Figure 7:
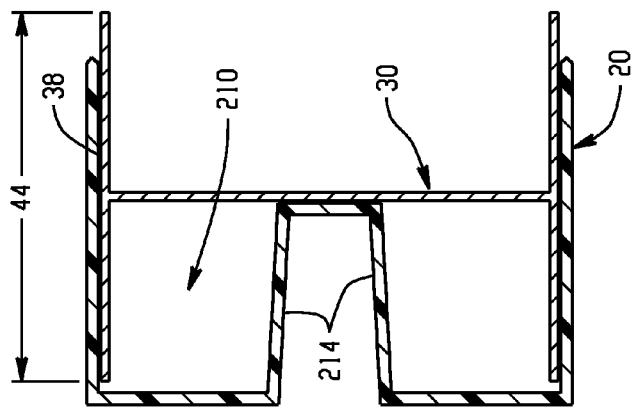
FIGS. 5-7 are cross-sectional views of several variants of the plastic members and inserts of FIG. 4.
Figure 6:
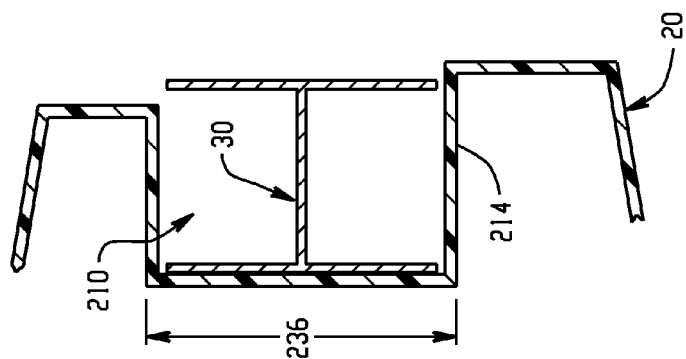
Figure 5:
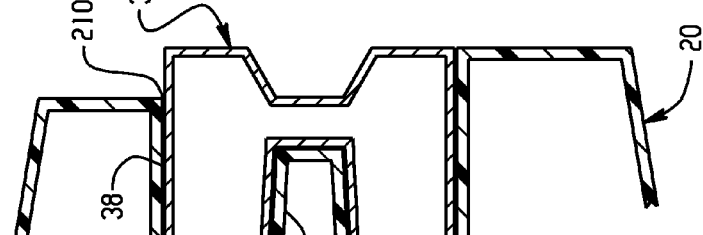
Figure 4:
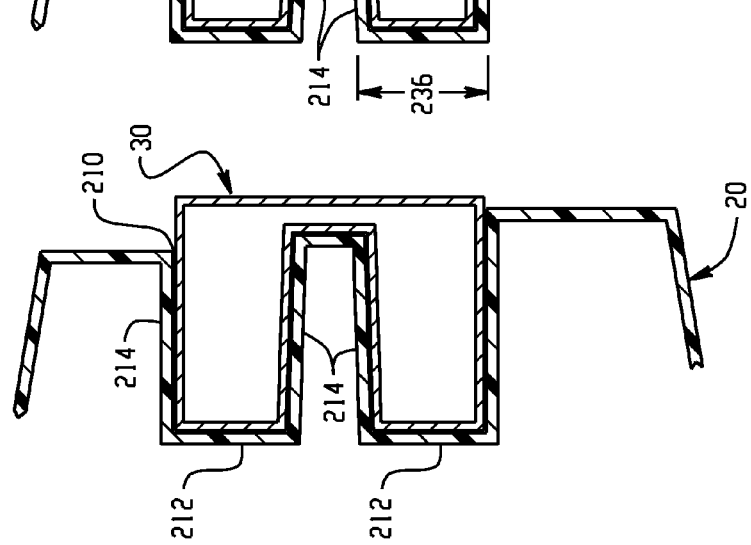
FIG. 4 is a cross-sectional view taken along lines A-A of FIG. 1 illustrating a plastic member and insert.
Figure 15:
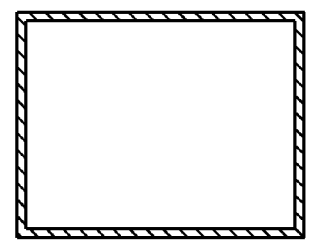
FIGS. 15-25 are cross-sectional views of embodiments of insert shapes.
Figure 16:
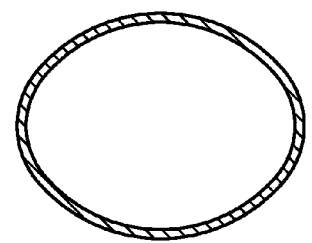
Figure 17:
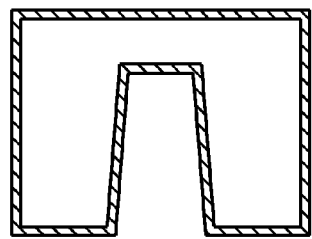
Figure 18:
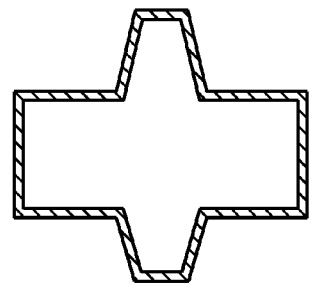
Figure 19:
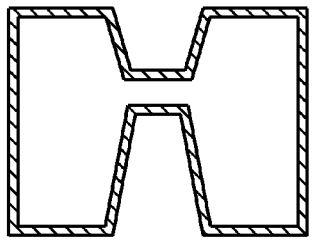
Figure 20:
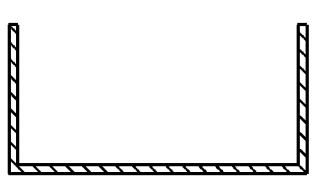
Figure 21:
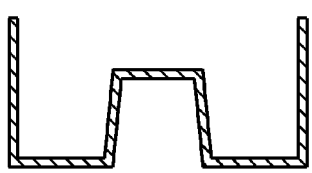
Figure 22:
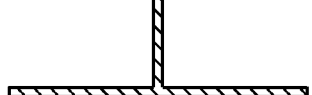
Figure 23:
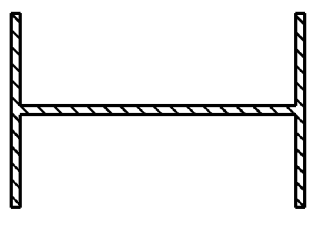
Figure 24:
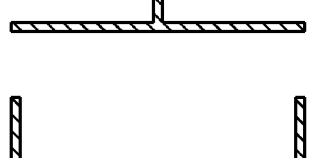
Figure 25:
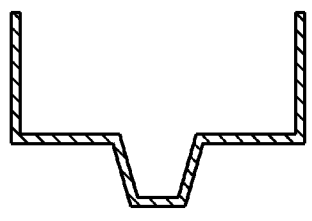

The plastic member channel (210) is configured to receive the insert (30) and hence has a complementary geometry. Some examples of channel geometries are illustrated in FIGS. 4-7 and 14. FIGS. 4-7 are cross-sectional illustrations of the plastic member (20), insert (30) and channel (210). For FIG. 4, the cross-section is taken along line A-A of FIG. 1. The other figures illustrate other possible cross-sectional designs (e.g., with the cross-section taken the same location as in FIG. 1, but with the different energy absorbing assembly design). As can be seen in FIGS. 4, 5, and 7, the channel can form protrusion(s) (212), or a single protrusion (212) as is illustrated in FIG. 6. As noted, the insert (30) disposed within the channel (210), has a shape complementary to the channel (210) to enable coupling of the two elements. Some examples of insert cross-sectional shape include a "W" (e.g., closed "W" as is illustrated in FIGS. 4, 5, 17, and 19, and an open "W" as is illustrated in FIG. 21) an "I" as is illustrated in FIGS. 6, 7, 22, and 23, a "T" as is illustrated in FIG. 24, "E" shape, "U" shape, and so forth, as well as other polygonal and rounded shapes, such as rectangular (see FIG. 15), square, circle, triangle, oval (see FIG. 16), partial rectangle (e.g., open rectangle; see FIG. 20), irregular (e.g., a closed rectangular shape with a protrusion on one or more sides (e.g., opposing sides); See FIG. 18; or an open rectangular shape with a protrusion on the elongated side extending away from the upper walls; see FIG. 25)). Optionally, inserts can be employed, e.g., stacked together such that the second side of one insert is complimentary to the first side of adjacent insert.

As can be seen from FIG. 1, (and considering the views provided with FIGS. 4-7), the insert (30), when employed, provides structural integrity to the protrusion(s) (212) of the plastic member (20). The protrusion(s) extend longitudinally across the plastic member (20). Since the metal inset (30) can be bowed (e.g., crowned, also referred to as convex, extending away from the vehicle), the protrusion(s) (212) can have a constant or variable length along their sides (214) (e.g., depth from the front wall to the base of the side (214)) as they extend longitudinally across the plastic member (20). For example, the length can increase toward a center (216) and can decrease away from the center (216). Alternatively, the length can be constant. The height (236) of the protrusion(s) (212) is sufficient to receive the insert (30). (See FIGS. 5 and 6) For example, the protrusion height (236) can be 10 mm to 40 mm, specifically 15 mm to 30 mm.

In the various embodiments, the length of the side (214) is 20 millimeters (mm) to 80 mm, specifically, 30 mm to 60 mm, and more specifically, 35 mm to 50 mm. With respect to the edge 38 of the insert, the length of the side (214) can be greater than or equal to 50%, specifically, greater than or equal to 70%, of the width (44) of the edge (38) (see FIG. 7). In order to inhibit torqueing of the insert (30) during an impact, desirably, the length of the side (214) is greater than or equal to 90% of the width (44), specifically greater than or equal to 95% of the width (44), more specifically, greater than or equal to 100% of the width (44), and yet more specifically, greater than or equal to 110% of the width (44). In other words, the side (214) is not merely a lip to contact a front edge of the insert, but can function as a structural member, e.g., to support the insert, inhibiting torqueing.

Figure 8:
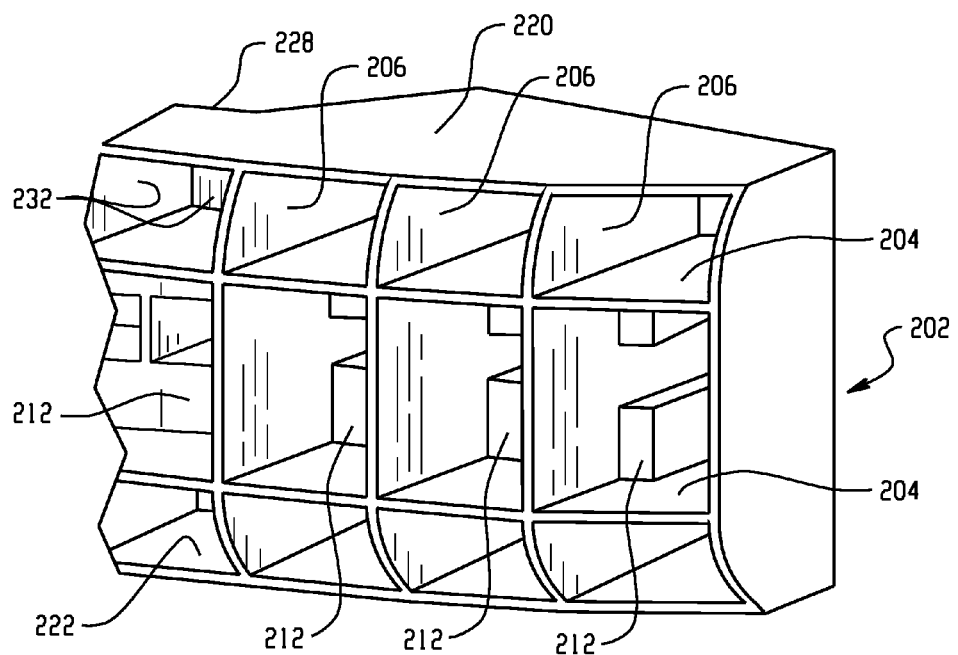
FIG. 8 illustrates an exploded partial right front perspective view of an end of the energy absorbing assembly of FIG. 1.

In addition to the protrusion(s) (212), the plastic member can comprise reinforcing elements. The amount and specific design of the reinforcing element(s) depends upon their location on the plastic member (20) and the desired structural integrity of that location. For example, rib(s) can extend from a base 200 (e.g. a rear wall; i.e. the wall that will be adjacent to the vehicle). The rib(s) can comprise horizontal rib(s) (204) that extend longitudinally (as with the protrusion(s) (212)) and/or vertical rib(s) (206) that extend laterally, across the horizontal rib(s) (204) (e.g., perpendicular to the horizontal rib(s) (204)). For example, vertical ribs (206) at the ends (202) can be spaced closer together and made of a stiffer material than vertical ribs (206) near the center (216). (See FIG. 8) In other words, crush cans can be formed at the ends of the plastic member (20) to enhance energy absorption upon off center impacts. The ends (202) can define a plane configured to be coplanar with the vehicle's rail supports. Optionally, the vertical ribs (206) at the ends (202) can extend from a top to a bottom of the plastic member (20), e.g., to form the crush cans. (See FIGS. 1, 5, and 8) Across the remainder of the plastic member (20), the vertical ribs (206) can extend between the top wall (220) and a protrusion (212), between adjacent protrusion(s) (212), and/or between a protrusion (212) and the bottom wall (222). (See FIGS. 1 and 5)

Besides the protrusions (212) and the end reinforcement (228) (i.e., reinforcement wall (232)), the plastic member (20) can be open in the front (224) (see FIG. 1), and besides the reinforcement cavity (234) and the channel (210) the plastic member (20) can be closed in the back (see FIG. 2). It is noted that the top most and bottom most walls can be solid walls with no openings, e.g., the plastic member can be injection molded with the mold halves extracting from the front and the rear.

For example, the vertical ribs (206) and horizontal ribs (204) can have a thickness of 1 mm to 6 mm, and can have a spacing of 10 mm to 200 mm. Where crush boxes are formed at the ends of the plastic member (20), the vertical ribs (206) and horizontal ribs (204) of the crush boxes are spaced closer together and/or have a greater thickness than the vertical ribs (206) and horizontal ribs (204) between the crush boxes. For example the vertical ribs (206) of the crush boxes can have a spacing of 10 mm to 80 mm and the horizontal ribs (204) of the crush boxes are can have a spacing of 10 mm to 80 mm, while the vertical ribs (206) between the crush boxes can have a spacing of 10 mm to 200 mm and the horizontal ribs (204) between the crush boxes are can have a spacing of 10 mm to 200 mm. For example, the vertical ribs (206) of the crush boxes can have a spacing of 40 mm to 70 mm and the horizontal ribs (204) of the crush boxes are can have a spacing of 40 mm to 70 mm, while the vertical ribs (206) between the crush boxes can have a spacing of 70 mm to 100 mm and the horizontal ribs (204) between the crush boxes are can have a spacing of 70 mm to 100 mm. Generally, when crush boxes are employed, the vertical ribs (206) between the crush boxes can have spacing that is greater than or equal to 10% less than the spacing of the vertical ribs (206) of the crush boxes (i.e., if the vertical ribs of the crush boxes have a spacing of 60 mm, the vertical ribs between the crush boxes will have a spacing of greater than or equal to 66 mm), specifically greater than or equal to 20% less than the spacing of the vertical ribs (206) of the crush boxes, and more specifically, greater than or equal to 30% less than the spacing of the vertical ribs (206) of the crush boxes. Alternatively, or in addition, when crush boxes are employed, the horizontal ribs (204) between the crush boxes can have spacing that is greater than or equal to 10% less than the spacing of the horizontal ribs (204) of the crush boxes, specifically greater than or equal to 20% less than the spacing of the horizontal ribs (204) of the crush boxes, and more specifically, greater than or equal to 30% less than the spacing of horizontal ribs (204) of the crush boxes.

Figure 9:
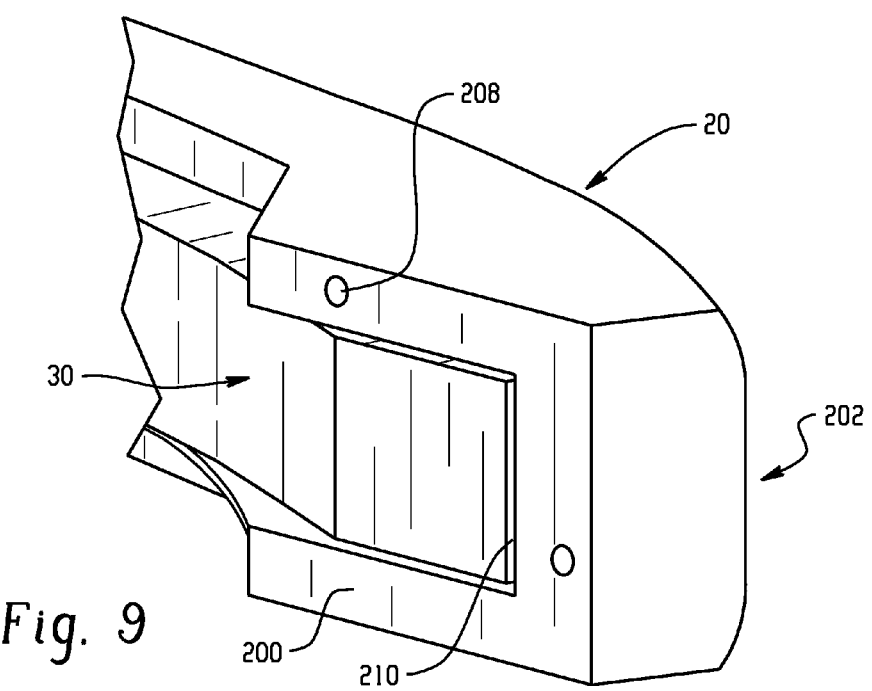
FIG. 9 illustrates an exploded partial right rear perspective view of an end of the energy absorbing assembly of FIG. 1.
Figure 10:
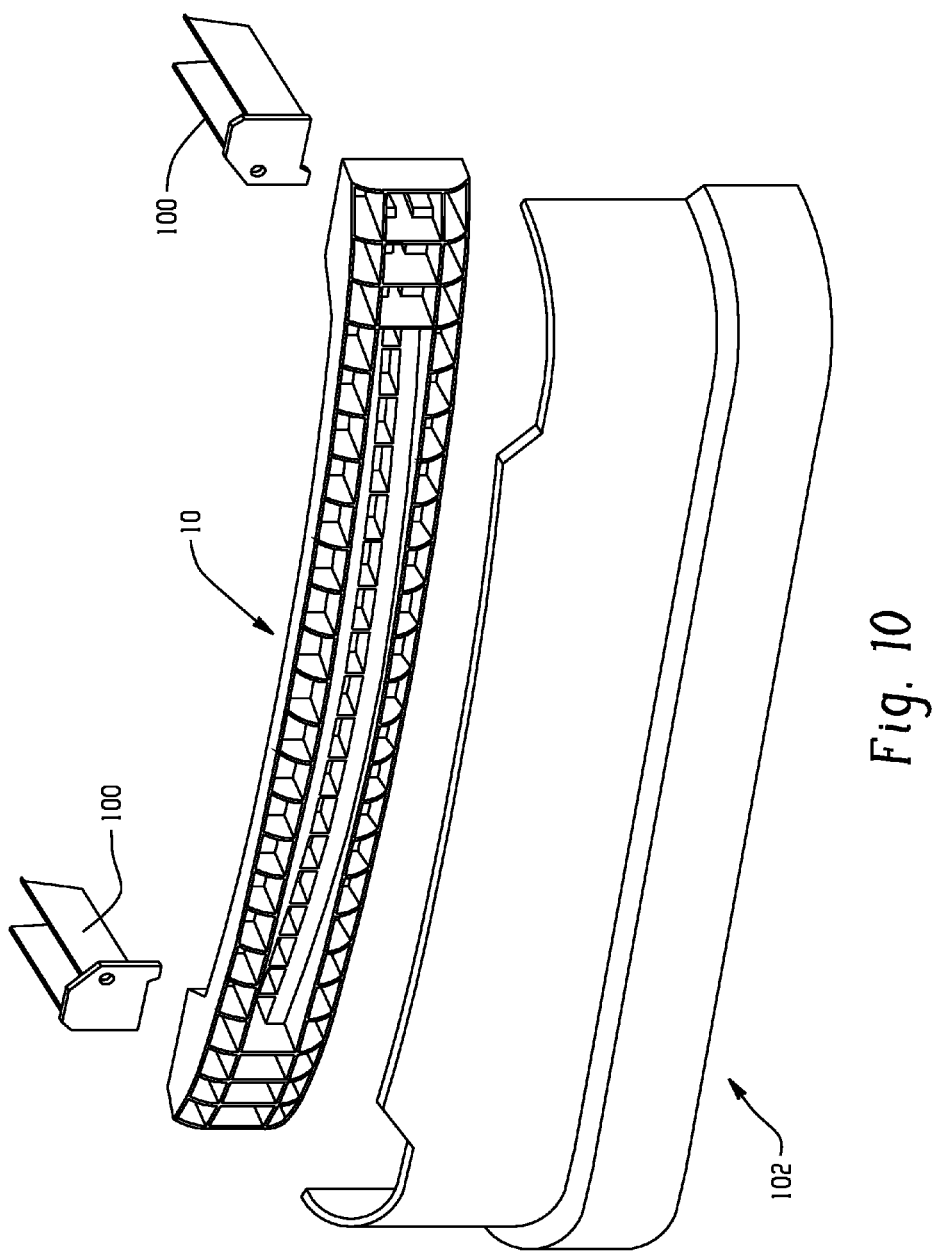
FIG. 10 is an expanded, isometric view of an embodiment of an energy absorbing assembly between a vehicle (namely the rail supports) and a fascia.

The base (200) adjacent the ends (202) of the plastic member (20) has an engagement region for attaching the energy absorbing assembly (10) to a vehicle, e.g., to vehicle rail supports (100), so that he energy absorbing assembly (10) is located between the fascia (102) and the supports (100). (e.g., see FIG. 10) For example, FIG. 9 illustrates bores (208) located in the end of the end (202) and configured to allow operable coupling of the plastic member (20) to a vehicle, e.g., to a rail support, with various attachment elements (e.g., bolts, screws, pins, etc.). It is noted that although the insert (30) could directly couple to the vehicle, generally only the plastic member (20) is designed to connect to the vehicle so that the ends of the insert (30) are located between the plastic member (20) and the vehicle (e.g., rail support (100)), thereby further securing the insert (30) within the plastic member (20) and providing structural integrity across the energy absorbing assembly (10). Such an arrangement also allows the plastic member (20) to be used independently of the insert (30). In other words, the plastic member (20) can be attached to a vehicle, without the metal inert (30) being disposed in the channel (i.e., the plastic member (20) can be used on a vehicle sans bumper beam and sans insert).

Figure 11:
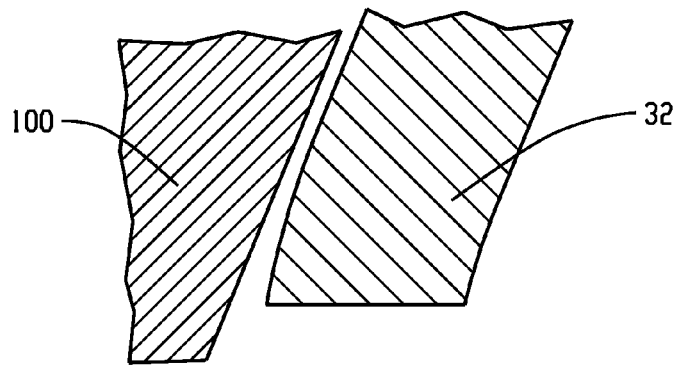
FIGS. 11-13 are partial, front views of embodiments of ends of inserts.
Figure 12:
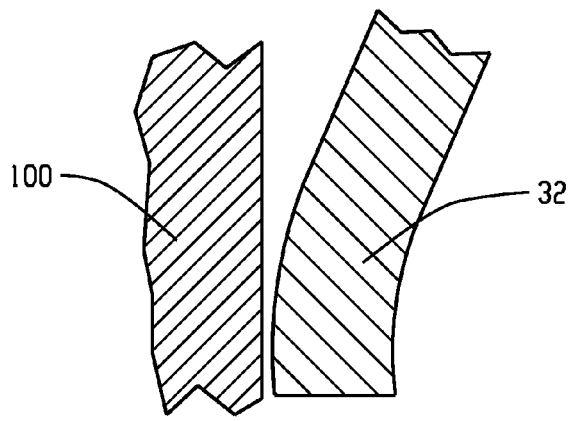
Figure 13:
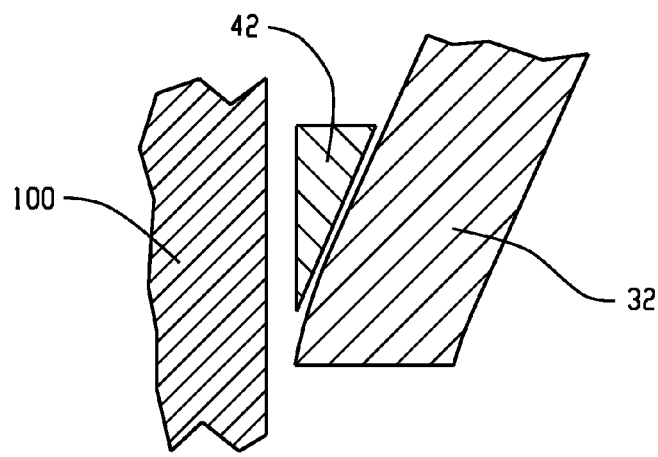

As can be seen in the various figures, the insert (30) can have ends (32) that extend into the engagement region near the ends (202) of the plastic member (20). The insert ends (32) can be flattened so as to enable contact between the insert and the vehicle attachment (e.g. rail support), e.g., forming a recurve bow shape. (e.g., see FIGS. 3 and 12) Alternatively, the insert can have angled ends (e.g., a fully bowed shape, and/or a shape that does not have flat ends or a recurve bow design), and can contact an angled vehicle attachment. (see FIG. 11) In another embodiment, a straightener (42) can be attached to the end (32) of the insert to enable the desired contact between the insert and the vehicle attachment. For example, FIG. 13 illustrates a straightener (32), such as a wedge, attached (e.g., welded) at the end (32) of the insert (30).

The efficiency of a bumper assembly is the amount of energy absorbed over distance, or the amount of energy absorbed over load. A high efficiency bumper system absorbs more energy over a shorter distance than a low energy absorber. High efficiency is achieved by building load quickly to just under the load limit of the object sought to be protected (e.g. vehicle rail, etc.) and maintaining that load constant until the impact energy has been dissipated.

To quantify the effectiveness of hybrid beam (shown in FIGS. 1 and 2) in absorbing the energy at moderate impacts, the most stringent IIHS deformable barrier impact is performed. Simulation tests are also performed to see if the plastic member alone would be able to absorb the required amount of energy during center pendulum impact at 4 kph (the most stringent among the ECE-42 requirements). A generic vehicle with a mass of 1,600 kilograms (Kg) is mounted with an energy absorbing assembly weighing approximately 6 Kg; 3 Kg plastic member and 3 Kg steel insert. The resulting vehicle is evaluated for the performance as required by the tests. It is observed that the plastic member weighing 3 Kg alone was sufficient to meet center pendulum impact with an intrusion level of less than 80 mm. Also, for the IIHS 10 kph impact, the energy absorbing assembly was observed to be sufficient to absorb energy close to 6,200 Joules (J) by maintaining the intrusion levels less than 140 mm. This energy absorbing assembly is observed to show comparable performance as that of a conventional steel beam weighing 8 Kg. Hence, significant amount of reduction in mass and cost is achieved with the energy absorbing assembly design, which also allows the original equipment manufacturers (OEMs) to remove the unwanted steel insert for the European and the Pacific Rim versions.

It is noted that the above mass is merely exemplary and with respect to a particular vehicle. For the energy absorbing assembly mass, to meet the various global requirements, is dependent on the vehicle mass, and for a vehicle with higher mass, the mass of the energy absorbing assembly may be increased appropriately. For example, the energy absorbing assembly could weigh around 8 Kg for a vehicle mass of 2,400 Kg.

As mentioned earlier, the current energy absorbing assembly focuses on a design for low-speed vehicle damageability. These energy absorbing assemblies have enabled significant savings in weight, processing times, and assembly times. For example, when comparing (for the same vehicle) the present energy absorbing assembly to a bumper beam system using a standard C-shaped energy absorber disposed in front of the bumper beam, and requiring both systems to meet ECE 42 and FMVSS part 581, the energy absorbing assembly is a reduction in weight of greater than 25% of the weight of the bumper system, specifically greater than or equal to 40% weight reduction, and more specifically, greater than or equal to 50% weight reduction. Although the efficiency and benefits of weight reduction and processing times will be lost, it is contemplated that the energy absorbing assemblies can be used in addition to a bumper beam.

It is noted that the sizes and shapes of the various elements of the energy absorbing assemblies disclosed herein may be discussed in relation to particular figures merely for convenience and clarity (e.g., to identify which dimension is being discussed). However, the sizes are intended to apply to all possible embodiments of the various elements and not merely the specific figures with which they are discussed.

In an embodiment, an energy absorbing assembly for impact energy absorption can comprise: an elongated plastic member having a major axis, a first side and a second side, comprising a central portion disposed between a first end portion and a second end portion, the second side defines a channel extending from the first end portion to the second end portion; and an elongated insert having a front, edges, tips, and a rear, wherein the insert is configured to flex upon impact, and is removably friction fit within the channel such that the plastic member surrounds the front, and greater than or equal to 50% of the edges and tips. The energy absorbing assembly can be configured to attach to a vehicle to absorb energy absorption impact.

In an embodiment, a vehicle can comprise: a vehicle rail and the energy absorbing assembly attached to the vehicle rail. The energy absorbing assembly comprises an elongated plastic member having a major axis, a first side and a second side, comprising a central portion disposed between a first end portion and a second end portion, the second side defines a channel extending from the first end portion to the second end portion; and an elongated insert having a front, edges, tips, and a rear, wherein the insert is configured to flex upon impact, and is removably friction fit within the channel such that the plastic member surrounds the front, and greater than or equal to 50% of the edges and tips. The energy absorbing assembly can be configured to attach to a vehicle to absorb energy absorption impact.

In another embodiment, a vehicle can comprise: a vehicle rail and an energy absorbing assembly attached to the vehicle rail. The energy absorbing assembly comprises an elongated plastic member having a major axis, a first side and a second side, comprising a central portion disposed between a first end portion and a second end portion, the second side defines a channel extending from the first end portion to the second end portion. The vehicle passes ECE 42.

In an embodiment, a system for impact energy absorption can comprise: an elongated plastic member having a major axis, a first side and a second side, comprising a central portion disposed between a first end portion and a second end portion, the second side defines a channel extending from the first end portion to the second end portion. The central portion can comprise a horizontal protrusion along the first side and defined by the channel, a plurality of central portion vertical ribs extending between a top wall and the protrusion, the protrusion and another protrusion, and/or between the protrusion and a bottom wall. The plastic member can comprise a crush box at the first end portion and at the second end portion, and wherein the crush box comprises a plurality of additional vertical ribs wherein the additional vertical ribs have a spacing that is less than a spacing of the central portion vertical ribs. The system can be configured to attach to a vehicle to absorb energy upon impact such that the vehicle passes ECE 42.

In the various embodiments: (i) the insert is a metal insert having a cross-section having a closed top W configuration extending vertically between the first and second side such that the closed top defines the second side; and/or (ii) the insert has a cross-section having a closed bottom W configuration extending vertically between the first side and second side such that the closed bottom defines the second side; and/or (iii) the plastic member further comprises a crush box at the first end portion and at the second end portion, and wherein the crush box comprises a plurality of additional vertical ribs wherein the additional vertical ribs have a spacing that is less than a spacing of the central portion vertical ribs; and/or (iv) the central portion comprises a horizontal protrusion along the first side and defined by the channel, a plurality of central portion vertical ribs extending between a top wall and the protrusion, the protrusion and another protrusion, and/or between the protrusion and a bottom wall; and/or (v) the insert has a cross-section having an I-beam configuration extending vertically between the first and second side such that the I-beam top defines the second side; and/or (vi) the insert has a cross-section having an I-beam configuration extending horizontally between the first and second side such that the I-beam side defines the second side; and/or (vii) plastic insert covers greater than or equal to 70% of the edges and tips (specifically, greater than or equal to 90% of the edges and tips) and wherein the back is open; and/or (viii) the first end portion and the second end portion are configured to attach directly to a vehicle; and/or (ix) the first end portion and the second end portion further comprise a bore extending perpendicular to the major axis through the plastic member, wherein the plastic member can attach to the vehicle via the bore; and/or (x) the plastic member is a single unitary body formed insitu; and/or (xi) the system, when weighing less than 7 Kg is capable of absorbing an impact at 9.6 kph when coupled to a 1,600 Kg vehicle with an intrusion of less than or equal to 140 mm; and/or (xii) the plastic member, when weighing less than 3.5 Kg, is capable of absorbing an impact at 4 kph when coupled to a 1,600 Kg vehicle with an intrusion of less than or equal to 80 mm; (xiii) the insert is formed from a material selected from metal, glass mat thermoplastic, long glass fiber filled thermoplastic, and a composition comprising at least one of the foregoing; and/or (xiv) the plastic member meets ECE 42 (Nov. 21, 1980) and/or FMVSS part 581 (Apr. 25, 1990) without the insert; and/or (xv) the energy absorbing assembly meets FMVSS part 581; and/or (xvi) the energy absorbing assembly meets IIHS 10 kph; and/or (xvii) the insert can have a cross-section having a configuration selected from "T" configuration, "E" configuration, "U" configuration, rectangular configuration, square configuration, circular configuration, triangular configuration, oval configuration, and a combination comprising at least one of the foregoing; and/or (xviii) the insert can have a cross-section having a configuration selected from partial rectangle configuration, closed rectangular configuration with a protrusion on one or more sides, and an open rectangular configuration with a protrusion on the elongated side extending away from the upper walls; and/or (xix) the first end portion and the second end portion can be configured to attach directly to a vehicle; and/or (xx) the first end portion and the second end portion further comprise a bore extending perpendicular to the major axis through the plastic member, wherein the plastic member can attach to the vehicle via the bore; and/or (xxi) the plastic member can be a single unitary body formed insitu; and/or (xxii) the energy absorbing assembly is attached directly to the rails (e.g., without the bump beam between the assembly and the rails); and/or (xxiii) the energy absorbing assembly is attached to the bumper beam and the bumper beam is attached to the rails.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to differentiate one element from another. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An energy absorbing assembly for impact energy absorption, comprising:
    an elongated plastic member having a major axis, a first side and a second side, wherein the elongated plastic member comprises a central portion disposed between a first end portion and a second end portion, wherein the second side comprises a channel extending from the first end portion to the second end portion; and
    an elongated insert having a front, edges, tips, and a rear, wherein the elongated insert is configured to flex upon impact, and is removably friction fit within the channel such that the elongated plastic member surrounds the front, and the elongated plastic member surrounds greater than or equal to 50% of the edges and tips;
    wherein the energy absorbing assembly is configured to attach to a vehicle to absorb energy upon impact.

2. The energy absorbing assembly of claim 1, wherein the central portion comprises a horizontal protrusion along the first side, and the central portion comprises a plurality of central portion vertical ribs extending between a top wall and the horizontal protrusion, the horizontal protrusion and another protrusion, and/or between the horizontal protrusion and a bottom wall.

3. The energy absorbing assembly of claim 2, wherein the plastic member further comprises a crush box at the first end portion and at the second end portion, and wherein the crush box comprises a plurality of additional vertical ribs wherein the additional vertical ribs have a spacing that is less than a spacing of the central portion vertical ribs.

4. The energy absorbing assembly of claim 1, wherein the elongated insert is a metal insert having a cross-section having a closed top W configuration extending vertically between the first and second side such that the closed top defines the second side.

5. The energy absorbing assembly of claim 1, wherein the elongated insert has a cross-section having a closed bottom W configuration extending vertically between the first side and second side such that the closed bottom defines the second side.

6. The energy absorbing assembly of claim 1, wherein the elongated insert has a cross-section having an I-beam configuration extending vertically between the first and second side such that the I-beam top defines the second side.

7. The energy absorbing assembly of claim 1, wherein the elongated insert has a cross-section having an I-beam configuration extending horizontally between the first and second side such that the I-beam side defines the second side.

8. The energy absorbing assembly of claim 1, wherein the elongated insert has a cross-section having a configuration selected from "T" configuration, "E" configuration, "U" configuration, rectangular configuration, square configuration, circular configuration, triangular configuration, oval configuration, and a combination comprising at least one of the foregoing.

9. The energy absorbing assembly of claim 8, wherein the elongated insert has a cross-section having a configuration selected from partial rectangle configuration, closed rectangular configuration with a protrusion on one or more sides, and an open rectangular configuration with a protrusion on the elongated side extending away from the upper walls.

10. The energy absorbing assembly of claim 1, wherein the elongated plastic member covers greater than or equal to 70% of the edges and tips and wherein a back of the elongated insert is open.

11. The energy absorbing assembly of claim 1, wherein the first end portion and the second end portion are configured to attach directly to a vehicle rail.

12. The energy absorbing assembly of claim 11, wherein the first end portion and the second end portion further comprise a bore extending perpendicular to the major axis through the plastic member, wherein the plastic member can attach to the vehicle rail via the bore.

13. The energy absorbing assembly of claim 1, wherein the plastic member is a single unitary body formed in situ.

14. The energy absorbing assembly of claim 1, wherein the assembly, when weighing less than 7 Kg, is capable of absorbing an impact at 9.6 kph when coupled to a 1,600 Kg vehicle with an intrusion of less than or equal to 140 mm.

15. The energy absorbing assembly of claim 1, wherein the plastic member, when weighing less than 3.5 Kg, is capable of absorbing an impact at 4 kph when coupled to a 1,600 Kg vehicle with an intrusion of less than or equal to 80 mm.

16. The energy absorbing assembly of claim 1, wherein the elongated insert is formed from a material selected from metal, glass mat thermoplastic, long glass fiber filled thermoplastic, and a composition comprising at least one of the foregoing.

17. The energy absorbing assembly of claim 1, wherein the insert can have a radius of curvature of greater than or equal to 500 mm.

18. The energy absorbing assembly of claim 1, wherein the insert has an elastic deformation with a resilience of greater than or equal to 5 kiloNewtons (kN).

19. A vehicle, comprising:
a vehicle rail; and
a energy absorbing assembly attached to the vehicle rail, the energy absorbing assembly comprising
an elongated plastic member having a major axis, a first side and a second side, wherein the elongated plastic member comprises a central portion disposed between a first end portion and a second end portion, wherein the second side comprises a channel extending from the first end portion to the second end portion; and
an elongated insert having a front, edges, tips, and a rear, wherein the elongated insert is configured to flex upon impact, and is removably friction fit within the channel such that the elongated plastic member surrounds the front, and the elongated plastic member surrounds greater than or equal to 50% of the edges and tips.

20. A system for impact energy absorption, comprising:
an elongated plastic member having a major axis, a first side and a second side, wherein the elongated plastic member comprises a central portion disposed between a first end portion and a second end portion, wherein the second side defines a channel extending from the first end portion to the second end portion;
wherein the central portion comprises a horizontal protrusion along the first side and the central portion comprises a plurality of central portion vertical ribs extending between a top wall and the horizontal protrusion, the horizontal protrusion and another protrusion, and/or between the horizontal protrusion and a bottom wall;
wherein the elongated plastic member comprises a crush box at the first end portion and at the second end portion, and wherein the crush box comprises a plurality of additional vertical ribs wherein the additional vertical ribs have a spacing that is less than a spacing of the central portion vertical ribs; and
wherein the system is configured to attach to a vehicle to absorb energy upon impact such that the vehicle passes ECE 42.

21. The system of claim 20, wherein the first end portion and the second end portion are configured to attach directly to a vehicle rail.

22. The system of claim 21, wherein the first end portion and the second end portion further comprise a bore extending perpendicular to the major axis through the plastic member, wherein the plastic member can attach to the vehicle via the bore.

23. The system of claim 20, wherein the plastic member is a single unitary body formed in situ.

* * * * *